US011487887B2

(12) United States Patent
Rooks

(10) Patent No.: US 11,487,887 B2
(45) Date of Patent: Nov. 1, 2022

(54) MICROPROCESSOR ATOMIC SECURE ENCRYPT AND SEND INSTRUCTION

(71) Applicant: Government of the United States as represented by the Secretary of the Air Force, Rome, NY (US)

(72) Inventor: John W. Rooks, Rome, NY (US)

(73) Assignee: United States of America as represented by the Secretary of the Air Force, Rome, NY (US)

(*) Notice: Subject to any disclaimer, the term of this patent is extended or adjusted under 35 U.S.C. 154(b) by 222 days.

(21) Appl. No.: 16/748,906

(22) Filed: Jan. 22, 2020

(65) Prior Publication Data

US 2020/0233970 A1    Jul. 23, 2020

Related U.S. Application Data

(60) Provisional application No. 62/795,274, filed on Jan. 22, 2019.

(51) Int. Cl.
| | | |
|---|---|---|
| *G06F 21/60* | (2013.01) | |
| *G06F 21/62* | (2013.01) | |
| *G06F 21/73* | (2013.01) | |
| *G06F 21/74* | (2013.01) | |

(52) U.S. Cl.
CPC ........ *G06F 21/602* (2013.01); *G06F 21/6209* (2013.01); *G06F 21/73* (2013.01); *G06F 21/74* (2013.01)

(58) Field of Classification Search
CPC .................. G06F 21/60; G06F 21/602; G06F 21/62–6209; G06F 21/70–72; G06F 21/73–75; G06F 21/78–79; G06F 2212/1052; H04L 63/0428; H04L 2209/60
See application file for complete search history.

(56) References Cited

U.S. PATENT DOCUMENTS

| 7,502,826 B2 | 3/2009 | Barron et al. |
| 9,798,898 B2 | 10/2017 | Henry et al. |
| 2014/0181474 A1 | 6/2014 | Gewitz et al. |
| 2017/0249130 A1* | 8/2017 | Smiljanic .................. G06F 8/43 |

FOREIGN PATENT DOCUMENTS

EP          3336737 A1 *  6/2018    ............. G06F 21/57

* cited by examiner

*Primary Examiner* — Kevin Bechtel
(74) *Attorney, Agent, or Firm* — AFRL/RIJ; Randall P. Jones

(57) ABSTRACT

Various embodiments of the disclosed subject matter provide systems, methods, architectures, mechanisms, apparatus, computer implemented method and/or frameworks configured for guaranteeing that a payload portion of every data packet provided to a secure/encrypted output port of a processor such as a microprocessor is encrypted.

14 Claims, 4 Drawing Sheets

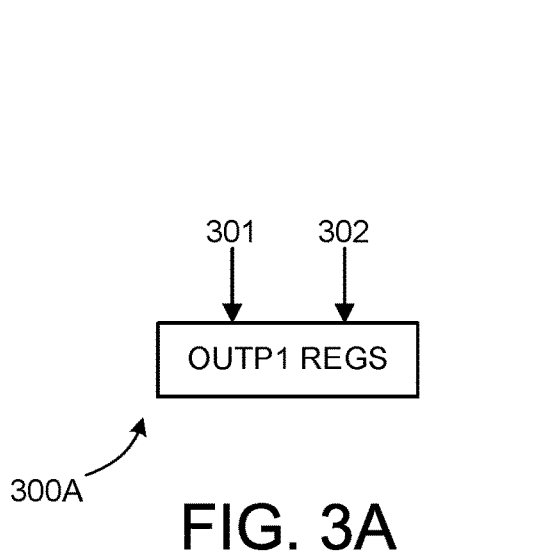
FIG. 3A
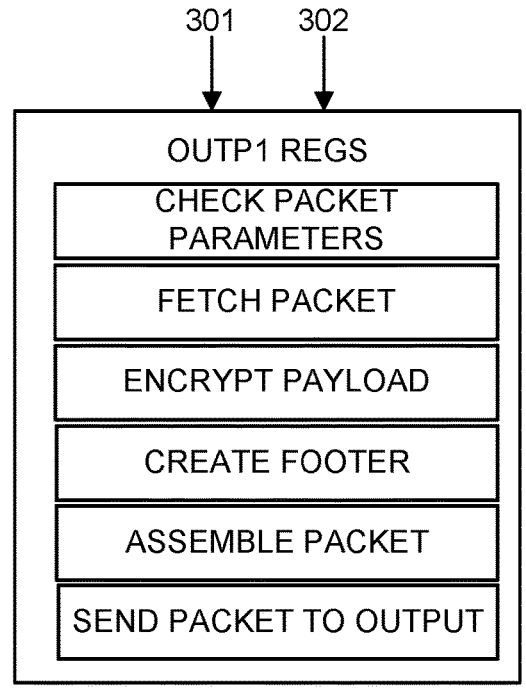
FIG. 3B
1. SHUT OFF INTERRUPTS
2. CHECK PACKET SIZE (AND OTHER PARAMETERS AS NEEDED)
3. FETCH PACKET
4. ENCRYPT PAYLOAD
5. CREATE MESSAGE FOOTER
6. ASSEMBLE PACKET
7. SEND PACKET TO OUTPUT
8. TURN ON INTERRUPTS
400
FIG. 4

MICROPROCESSOR ATOMIC SECURE ENCRYPT AND SEND INSTRUCTION

CROSS-REFERENCE TO RELATED APPLICATION

This application claims the benefit of and priority to prior filed Provisional Application Ser. No. 62/795,274, filed Jan. 22, 2019, entitled MICROPROCESSOR ATOMIC SECURE ENCRYPT AND SEND INSTRUCTION, which is incorporated herein by reference in its entirety.

GOVERNMENT INTEREST

The invention described herein may be manufactured and used by or for the Government of the United States for all governmental purposes without the payment of any royalty.

FIELD OF THE DISCLOSURE

The present disclosure relates generally to microprocessor architecture and, more particularly, to microprocessor architecture configured to improve software security.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Computer security is currently a difficult problem with limited opportunities to make definitive statements (i.e., verifications/certifications) about the ability of hardware and/or software associated with a system to protect critical information processed by the system. It would be desirable to guarantee that data going out a particular output port was encrypted with a valid key, or at a minimum was encrypted with a random number in the case where a valid key was not available.

Current microprocessors are able to map their output ports to a memory region (memory-mapped input/output), dedicate special instructions to communication with their various outputs, or both. In the memory mapped output case, it may not be known where a particular store operation is sending its data until runtime when the address becomes known. This address could point to memory or, in the memory-mapped output case, an output port. Alternatively, by only using special output instructions that are specific to each output port, it is known at code compilation/assembly time exactly which instructions within the software cause data to be sent to a particular output port.

Certain output ports are designed to accept data packets, each packet typically consists of a header (including destination address, source address, and/or other information), a payload (the data to be delivered to the intended destination, such as an application), and error checking/correcting codes (checksum, forward error correction, or other codes to enable detection and/or correction of payload corruption during packet transmission).

Microprocessors can be designed to have each instruction execute in a single clock cycle, or can allow for multi-cycle instructions. The multi-cycle instructions can be controlled by microcode. Microcode is typically stored in an on-chip read only memory, it controls the internal logic of the processor, and one microcode line controls the processor's internal units for one clock cycle. The microcode is read out by a micro-sequencer which executes any number of microcode operations from the microcode memory to form a complex assembly instruction.

Microprocessors can perform encryption on data using many very basic assembly instructions, or they can have more complex microcode based encryption instructions that handle more or all of the steps within a single complex assembly instruction. A complex encryption instruction can utilize existing microprocessor hardware or can operate with a dedicated hardware encryption unit, in which case the microcode instruction primarily just waits for the hardware to complete the encryption and picks up the encrypted data.

Microprocessors typically have provisions for interrupts. Interrupts allow for an external, or internal event to trigger a change in the execution control flow, they change the next instruction to be executed by directing the processors program counter to a new memory location, where a different software process resides. At a later point in time the processor will return from that interrupt and continue executing code from where it left off.

When attempting to make security assertions regarding the behavior of a microprocessor running specific software, it is often necessary to assume instructions were executed without a different process/thread of the software corrupting the state of the software or data part way through its execution. A multi-cycle instruction can be created in a manner that is not interruptible. An instruction or larger block of code that is not interruptible or cannot be split is referred to as an atomic operation.

SUMMARY OF THE INVENTION

Various deficiencies in the prior art are addressed below by the disclosed systems, methods and apparatus configured for guaranteeing that a payload portion of every data packet provided to a secure/encrypted output port of a processor such as a microprocessor is encrypted. In particular, various embodiments contemplate an atomic output instruction operative to receive header and payload data of an output packet, encrypt the payload data and send the resulting packet with encrypted payload data to a particular output port. To verify or guarantee or otherwise enforce/constrain a particular piece of software to always encrypting its output data payload, the owner of the system being programmed may only allow the "Atomic_Encrypt_And_Send", (AEAS), instruction to be used for output.

A method of guaranteeing encryption of data provided at a secure output port of a microprocessor is achieved according to one embodiment by configuring a microprocessor such that the microprocessor does not execute any instruction within a normal instruction set of the microprocessor that (a) supports compile-time unresolvable port addressing or (b) supports data output to a secure port without encryption of the data.

A microprocessor configured to guarantee encryption of data provided at a secure output port according to one embodiment comprises an instruction set architecture (ISA) modified to avoid executing any instruction within a normal instruction set of the microprocessor that (a) supports compile-time unresolvable port addressing or (b) supports data output to a secure port without encryption of the data. In various embodiments, the microprocessor is configured as a reduced instruction set microprocessor wherein an implemented instruction set architecture (ISA) lacks an ability to execute any instruction within a normal instruction set of the microprocessor that (a) supports compile-time unresolvable addressing or (b) supports data output to a secure port without encryption of the data. In other embodiments, the microprocessor comprises a full instruction set microprocessor having a secure operating mode which, when invoked, inhibits microprocessor execution of any instruction within a normal instruction set of the microprocessor that (a) supports compile-time unresolvable port addressing or (b) supports data output to a secure port without encryption of the data.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIG. 3A depicts an exemplary port-restricted output instruction 300A;

FIG. 3B depicts steps associated with an Atomic Encrypt And Send instruction (AEAS) processing method suitable for use in replacing the exemplary port-restricted output instruction of FIG. 3A;

FIG. 4 depicts a flow diagram of a method of converting a port-restricted output instruction into a corresponding AEAS instruction and FIG. 5 depicts a flow diagram of a secure mode selection method according to an embodiment.

Figure 1:
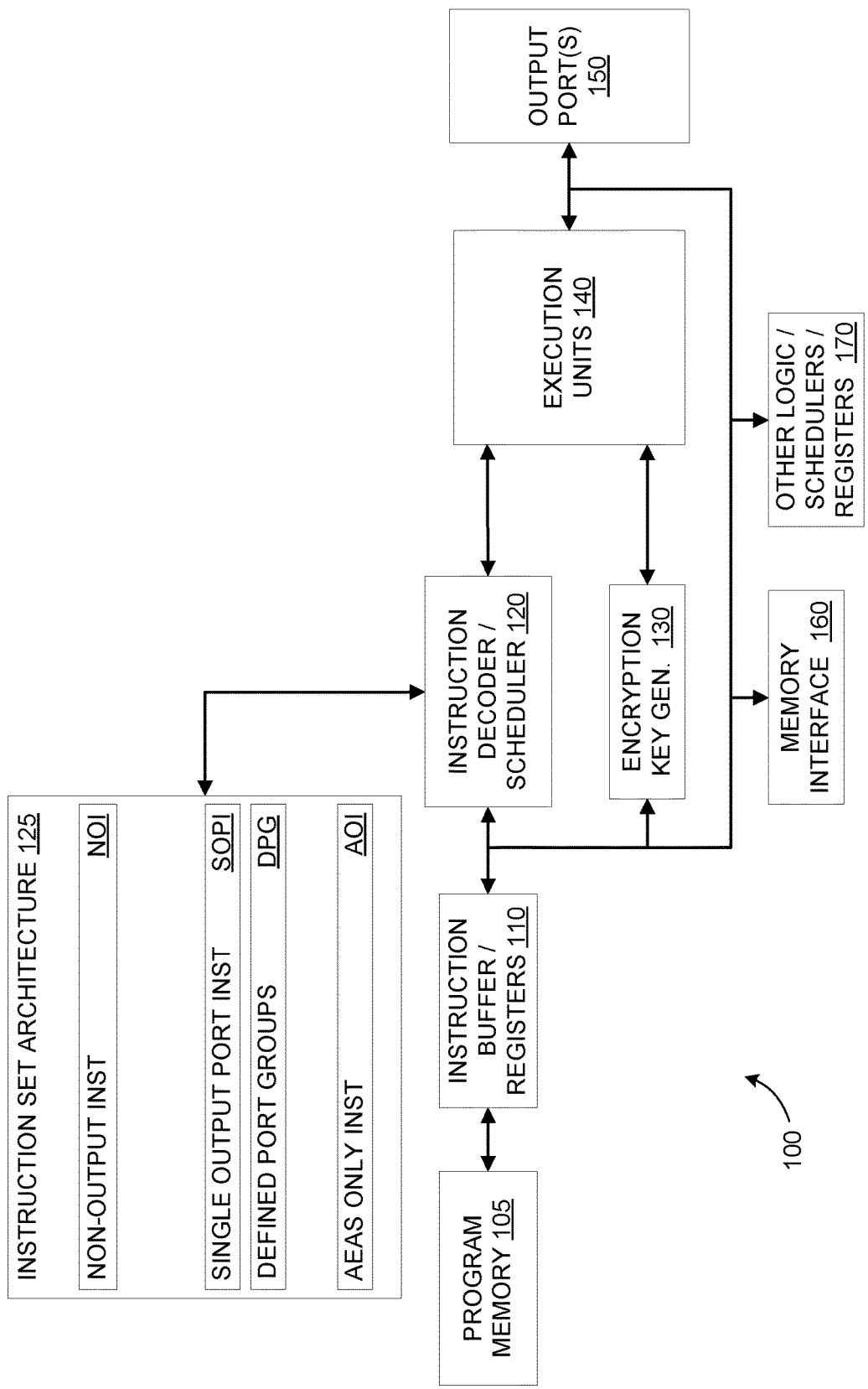
FIG. 1 depicts a simplified block diagram of a microprocessor architecture according to an embodiment.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Various embodiments contemplate an atomic output instruction operative to receive header and payload data of an output packet, encrypt the payload data and send the resulting packet with encrypted payload data to a particular output port. To verify or guarantee that a particular piece of software will always encrypt its payload, the owner of the system being programmed may only allow the "Atomic_Encrypt_And_Send", (AEAS), instruction to be used for output.

As discussed herein, a secure output port comprises an output port of a microprocessor to which only encrypted data is to be provided. A secure output port (or associated interconnections, cabling and the like) may also be identified as an encrypted and/or a black data output port (or associated interconnections, cabling, and the like). Similarly, a non-secure output port comprises an output port of a microprocessor to which non-encrypted data may be provided. A non-secure output port (or associated interconnections, cabling and the like) may also be identified as a non-encrypted and/or a red data output port (or associated interconnections, cabling, and the like).

Various embodiments contemplate that the verification or guarantee that a particular piece of software will always encrypt its payload may be implemented by a software development tool or processor (e.g., a microprocessor) that does not include/utilize instructions that send unencrypted data to any output port, to any secure/encrypted output port, or to one or more particular output ports. In these embodiments, the owner may be able to search assembly code (e.g., from a for any non-AEAS compiler, library or other source) for any non-AEAS output instructions, the owner may be able to search the binary executable code (e.g., microprocessor executable code or code file) instructions, or the owner may provide that the hardware (e.g., microprocessor) is incapable of executing non-encrypting output instructions. In this final case no software review or proof is necessary. Creating this atomic instruction greatly simplifies verification of data protection. And the instruction can be enhanced with features such as key rolling or other steps that are critical to a particular protocol.

Various embodiments provide a microprocessor configured in a manner enabling verification that software executed by the microprocessor will never result in an unencrypted payload being sent to any output port or, in the case of a microprocessor including both secure/encrypted and non-secure/plaintext output ports, sent to a secure/encrypted output port.

Various embodiments provide a compiler configured to not only generate executable code for a microprocessor in a manner enabling verification that software executed by the microprocessor will never result in an unencrypted payload being sent to an output port or, in the case of a microprocessor including both secure/encrypted and non-secure/non-encrypted output ports, sent to a secure/encrypted output port.

Various embodiments contemplate the use of one or more new/dedicated complex output instructions including payload encryption and enabling software evaluation prior to execution to verify that the software, when executed by the microprocessor, will never result in an unencrypted payload being sent to an output port or, in the case of a microprocessor including both secure/encrypted and non-secure/non-encrypted output ports, sent to a secure/encrypted output port.

FIG. 1 depicts a simplified block diagram of an exemplary microprocessor architecture according to various embodiments. It will be noted that some of the typical components/functions of a microprocessor have been omitted form this description in the interests of clarity. Further, various components/functions of the exemplary microprocessor 100 may be modified to perform their functions in a manner differing from that described herein, as will be appreciated by those skilled in the art.

As depicted in FIG. 1, microprocessor 100 includes a program memory 105 for storing executable instructions, an instruction buffer and various related registers 110 for retrieving executable instructions from the program memory 105 and providing the executable instructions to an instruction decoder/scheduler 120 which decodes the instructions in accordance with the instruction set architecture 125 to determine the specific instruction, to generate as needed a number of instructions in an internal instruction set, and to schedule the determined/generated instructions for execution by execution units 140. Those instructions generating output data cause such data to be encrypted (e.g., using a key generated by encryption key generator 130) and transmitted to one or more output ports 150. In various embodiments, the output ports 150 may comprise one or more secure output port, or a combination of secure output ports and non-secure output ports. Also depicted in the simplified block diagram of FIG. 1 is a memory interface 160 and various other logic, schedulers, registers 170. The various components depicted in the simplified block diagram may interact with each other via direct between components, a data/control interface connecting some or all of the components and so on as is known in the art.

The instruction set architecture 125 provide the various commands to be implemented by the execution units 140 in response to the decoded program processed by the instruction decoder/scheduler 120. The normal instruction set associated with the processor defined the various addressing modes, instructions, native data types, registers, memory architecture, interrupt and exception handling, external input output functions and so on normally utilized by the processor, though modified as described herein.

The instruction set architecture 125 is depicted as including non-output instructions NOI, single output port instructions SOPI, and Atomic_Encrypt_And_Send AEAS instructions. Output port group instructions direct output to some output ports but not others. For example, those output ports that are a member of a specific output port group, such as "all encrypted ports" or "some encrypted ports" or "encrypted ports 1-4 and 8-10" or "all unencrypted ports" and so on.

Non-output instructions NOI comprise any instructions within the normal instruction set associated with the processor which cannot send data to an output port, including a memory mapped output port. These instructions are executed in the standard manner.

Single output port instructions SOPI comprise any instructions within the normal instruction set associated with the processor which are directed to sending data to a specific or predefined output port. These instructions are executed in a standard manner (i.e., not replaced with an AEAS instruction) only if the output port is a non-secure output port. In various embodiments it is envisioned that the processor does not use any non-secure output ports, in which case there are no SOPI instructions executed by the processor. Optionally, the instruction set architecture may include defined port group (DPG) information used to identify some or all of the output ports as secure and/or non-secure. In the case of a processor having some non-secure output ports, the SOPI instructions associated with the non-secure output ports may be executed in a standard manner (i.e., not replaced with an AEAS instruction).

Atomic_Encrypt_And_Send AEAS instructions comprise sequences of instructions used to replace any instructions within the normal instruction set associated with the processor which are capable of sending an unencrypted payload to an output port or, in the case of a processor including both secure and non-secure output ports, sending an unencrypted payload to a secure output port.

In various embodiments, the instruction set architecture 125 is implemented in a manner that does not include those instructions which are capable of sending an unencrypted payload to an output port or, in the case of a processor including both secure and non-secure output ports, sending an unencrypted payload to a secure output port. That is, the instruction set architecture 125 comprises a modified instruction set architecture 125 wherein certain instructions are not used at all (e.g., not implemented via the compiler, recognized by the microprocessor, or both.

In various embodiments, the instruction set architecture 125 is implemented in a manner that includes AEAS replacement instructions for those instructions which are capable of sending an unencrypted payload to an output port or, in the case of a processor including both secure and non-secure output ports, sending an unencrypted payload to a secure output port. That is, the instruction set architecture 125 comprises a modified instruction set architecture 125 wherein decoding an instruction with the proscribed capability results in a decoding a replacement AEAS instruction.

The AEAS instruction used to replaces the proscribed instruction may be hard coded into the instruction set architecture 125, invoked on the fly by the instruction decoder 120, or otherwise invoked by the processor 100 during execution of the program.

In various embodiments where the instruction set architecture does not support proscribed instructions, it is necessary to ensure that executable code generated by a compiler for use by the processor does not include such instructions.

Figure 2:
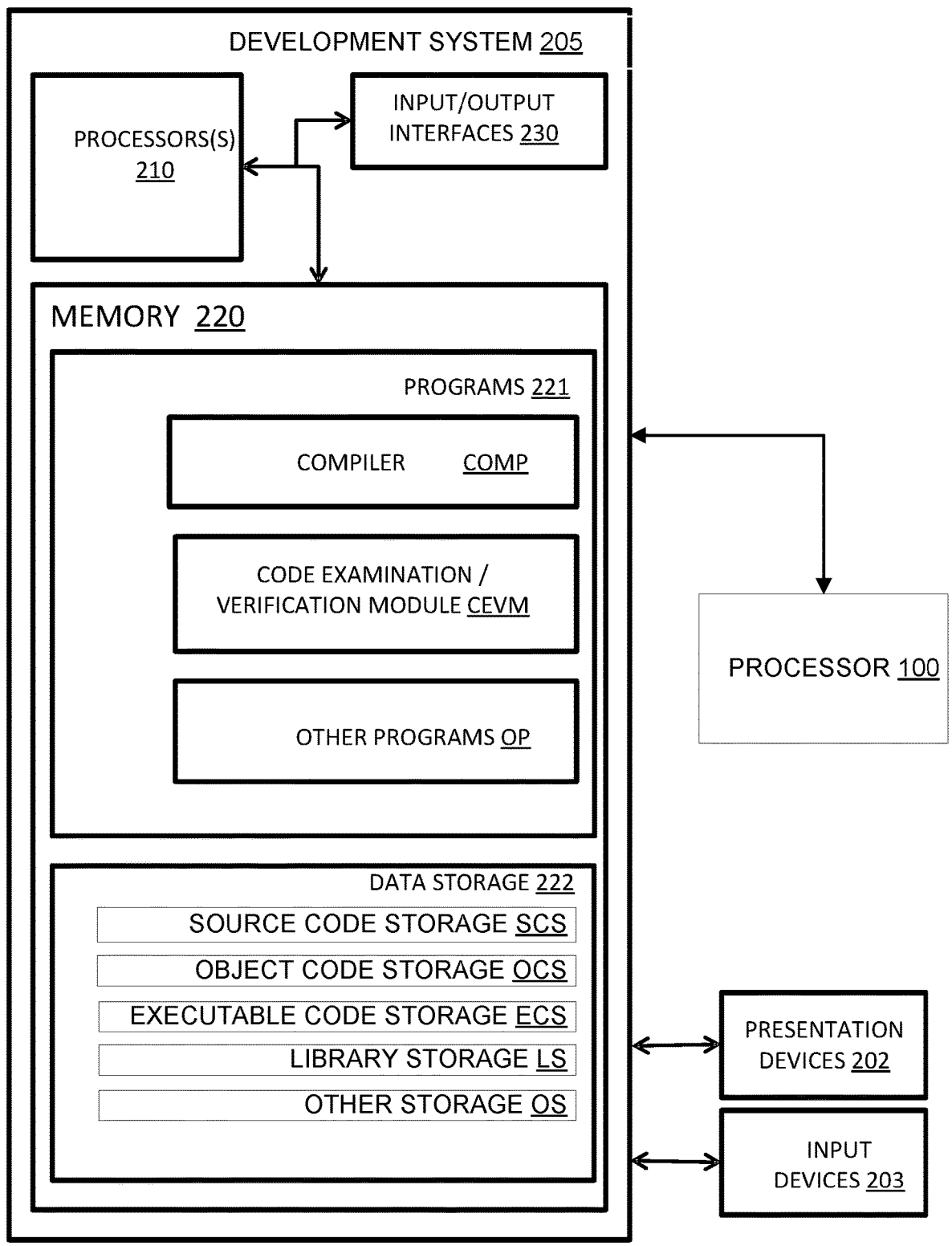
FIG. 2 depicts a high-level block diagram of a system 200 according to an embodiment.

FIG. 2 depicts a high-level block diagram of a system 200 according to an embodiment. The system 200 of FIG. 2 comprises one or more data processing elements, computing devices, network elements and the like cooperating as described herein to implement various embodiments. Not all of the described data processing elements, computing devices, network elements and the like are necessary to implement each embodiment. The exemplary system 200 described herein is provided for illustrative purposes only.

The system 200 of FIG. 2 contemplates a server, workstation or other computing device implementing a software development system 205 operating in accordance to the various embodiments, such as described herein and with respect to the various other figures. Specifically, the software development system 205 of FIG. 2 is configured to compile/process source code, assembly code, library functions and the like to generate executable code suitable for use by a controller (e.g., processor 100 of FIG. 1) in a manner enabling verification that software executed by the microprocessor will never result in an unencrypted payload being sent to an output port or, in the case of a microprocessor including both secure and non-secure output ports, sent to a secure output port.

As shown in FIG. 2, the software development system 205 is configured in a particular manner in terms of hardware, software, input/output resources, connected devices/functions and the like. However, it will be appreciated by those skilled in the art that the software development system 205 may be configured according to any one of a number of computing topologies or configurations. That is, software development system 205 may comprise a general-purpose computer, a special purpose computer, a specific type of server and/or any other computing device capable of performing the various functions described herein. Thus, the software development system 205 as described herein with respect to FIG. 2 may also be implemented as a general-purpose computing device.

As depicted in FIG. 2, the software development system 205 includes one or more processors 210, a memory 220, and one or more input/output (I/O) interfaces 230. The processor 210 is coupled to each of memory 220, and I/O interface(s) 230.

The processor 210 is configured for controlling the operation of the software development system 205, including operations supporting the methodologies described herein with respect to the various figures.

The memory 220 is configured for storing information suitable for use in performing the various software development system functions described herein according to the various embodiments. Specifically, memory 220 may store programs 221, data 222 and so on. Within the context of the various embodiments, the programs 221 and data 222 may vary depending upon the specific functions implemented by the software development system 205.

Generally speaking, the memory 220 may store any information suitable for use by the software development system 205 in implementing one or more of the various methodologies or mechanisms described herein. It will be noted that while various functions are associated with specific programs or databases, there is no requirement that such functions be associated in the specific manner. Thus, any implementations achieving the functions of the various embodiments may be used.

The I/O interface(s) 230 may be coupled to one or more presentation devices (PDs) 202 such as associated with display devices for presenting information to a user, one or more input devices (IDs) 203 such as computer display, touch screen or keypad input devices for enabling user input, and/or interfaces enabling communication between the software development system 205 and other computing, networking, presentation or input/output devices (not shown).

Presentation devices 202 may include any presentation devices suitable for use in enabling user interaction with the software development system 205, such as a display screen, a projector, a printer, one or more speakers, and the like, which may be used for displaying data, displaying video, playing audio, and the like, as well as various combinations thereof. Typical presentation interfaces associated with user devices, including the design and operation of such interfaces, will be understood by one skilled in the art. In various embodiments, the presentation devices are not utilized.

Input devices 203 may include any user control devices suitable for use in enabling user interaction with the software development system 205, such as touch screen-based user controls, stylus-based user controls, a keyboard and/or mouse, voice-based user controls, and the like, as well as various combinations thereof. Typical user control interfaces of user devices, including the design and operation of such interfaces, will be understood by one skilled in the art. In various embodiments, the input devices 203 are not utilized.

As depicted in FIG. 2, the programs portion 221 of memory 220 includes functional modules denoted as follows: a compiler COMP, a code examination and verification module CEVM and various other programs OP suitable for use in implementing or supporting the various embodiments. As depicted in FIG. 2, the data storage portion 222 of memory 220 includes functional modules denoted as follows: source code storage SCS, object code storage OCS, executable code storage ECS, library storage LS and other storage OS.

The compiler COMP is configured to compile source code, in-line assembly code, code associated with library functions and the like to responsively generate object code and executable code.

The various embodiments of the software development system 205 may be configured to ensure and/or verify that the resulting executable code will not, when executed by the processor, result in an unencrypted payload being sent to an output port or, in the case of a microprocessor including both secure and non-secure output ports, sent to a secure output port.

In various embodiments, the software development system 205 may be configured to restrict the use of in-line assembly instructions during the compilation process to either exclude from compilation any in-line assembly instructions, or limit in-line assembly instructions to those assembly instructions that are not capable of sending unencrypted data to any output port, to any secure output port, or to one or more particular output ports.

In various embodiments, the software development system 205 may be configured to restrict the available library functions to exclude from compilation any library function capable of sending unencrypted data to any output port, to any secure output port, or to one or more particular output ports.

In various embodiments, the code examination and verification module CEVM may be invoked to examine one or more of the source code, object code and executable code associated with the compilation process to verify that there are no instructions included therein capable of sending unencrypted data to any output port, to any secure output port, or to one or more particular output ports.

As depicted in FIG. 2, the software development system 205 communicates with a processor 100 to load executable code thereon. It is noted that such code may be provided to the processor 100 directly, via a loading device (not show), via hard coding of the processor to include the executable program, via loading of the processor within a product production environment, via updating processor software in the field and so on as is known in the art.

Although primarily depicted and described as having specific types and arrangements of components, it will be appreciated that any other suitable types and/or arrangements of components may be used for the software development system 205.

It will be appreciated that the functions depicted and described herein may be implemented in software and/or hardware, e.g., using a general-purpose computer, one or more application specific integrated circuits (ASIC), and/or any other hardware equivalents. In one embodiment, the various programs depicted as loaded within memory 220 are executed by the processor(s) 210 to implement their respective functions. It will also be appreciated that the various programs may be stored on a computer readable storage medium prior to being loaded into memory 220; such computer readable storage media comprising semiconductor memory devices, magnetic media, optical media, electromagnetic media and the like. Generally speaking, any form of tangible computer memory may be used to store computer instructions which, when executed by the processor 210, operate to perform the various methods and functions described herein.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in tangible fixed or removable media, transmitted via a data stream in a broadcast or other tangible signal-bearing medium, and/or stored within a memory within a computing device operating according to the instructions.

FIG. 3A depicts an exemplary port-restricted output instruction 300A.

Specifically, FIG. 3A depicts a predefined destination port "output" assembly code instruction 300A (i.e., an instruction used to move data that is located in one of a processor's registers to a specific output port. Since the predefined destination port output instruction 300A is directed to a predefined output port, there is no destination port number or port address specified as part of the instruction. The predefined destination output instruction 300 only identifies that data which resides in a source register 302 (REGS) is to be specified for a particular opcode 301 (OUTP1).

Knowing where data is sent to a particular output register is a critical first step towards being able to make security assertions about data going to that output port. The assembly instruction OUTP1 301, which stands for "output the contents of a register to port 1" may be enhanced in various embodiments to perform an atomic sequence of simple instructions. The resulting atomic sequence is a complex instruction denoted herein as an Atomic Encrypt And Send (AEAS) instruction. An AEAS may be identified as an instruction sending data to a particular output port. Different output ports would each have their own atomic encrypt and send instruction, AEAS1, AEAS2, AEAS3 etc.

FIG. 4 depicts a flow diagram of a method of converting a predefined destination port "output" assembly code instruction into an Atomic_Encrypt_And_Send (AEAS) instruction such that processor execution based upon this instruction is incapable of sending an unencrypted payload to an output port or, in the case of a microprocessor including both secure and non-secure output ports, sending an unencrypted payload to a secure output port.

Specifically, FIG. 4 depicts a method 400 by which each instance of a predefined destination port "output" assembly code instruction such as described above with respect to FIG. 3A may be replaced by a corresponding AEAS instruction (i.e., a sequence of microprocessors internal micro instructions) during a compilation process. It is noted that the exemplary sequence of instructions for converting a predefined destination port "output" assembly code instruction into an AEAS instruction comprises a sequence of instructions operative to ensure that the payload of a packet is encrypted prior to being sent to an output port. Further, it is noted that the specific instructions used to convert the functionality of the instruction (e.g., predefined destination port "output" assembly code instruction) into an AEAS instruction may be implemented using difference instructions sequences for any particular processor and/or differing processor architectures. As such, the steps described herein are merely exemplary of the broader concept of replacing with an AEAS instructions those processor instructions otherwise capable of sending an unencrypted payload to an output port or, in the case of a microprocessor including both secure and non-secure output ports, sending an unencrypted payload to a secure output port.

As depicted in FIG. 4, the exemplary sequence of instructions used to replace a predefined destination port "output" assembly code instruction comprises instructions that (1) shut off the processor's interrupts (necessary to help ensure a partially processed packet isn't modified by interrupting code); (2) check the overall packet size and other parameters regarding encryption keys and the like; (3) fetch the packet to bring the packet payload into the processor core; (4) encrypt the payload of the packet; (5) create the necessary checksums and/or other information that needs be included as a message footer or similar structure of the packet; (6) assemble the packet such as a packet comprising a header, encrypted payload, and message footer; (7) send the packet to the output port (e.g., a predefined port as in the above example); and (8) turn on the processor's interrupt.

The conversion method 400 described above with respect to the predefined destination port "output" assembly code instruction are exemplary of a conversion method that may be modified to be used to replaces any instructions within the instruction set of the processor that are otherwise capable of sending an unencrypted payload to an output port or, in the case of a microprocessor including both secure and non-secure output ports, sending an unencrypted payload to a secure output port.

FIG. 3B depicts steps associated with an Atomic Encrypt And Send instruction (AEAS) processing method 300B representing a combination of message related steps/instructions forming a single uninterruptible complex instruction used to replace the exemplary port-restricted output instruction 300A described herein with respect to FIG. 3-4. Each of the steps represented in FIG. 3B may comprise one or more assembly instructions, resulting in a final step of sending a packet with an encrypted payload to an output. FIG. 4 is a complex single assembly instruction implementing the AEAS. Specifically, the steps as depicted in FIG. 3B perform a check on packet parameters, fetch the packet, encrypt the payload, create a message footer, assemble the packet and send the packet to the output. By combining all steps that are required to ensure a message is sent to the output port with the message body encrypted, the software developer is provided with a method to test for and prove that their software does not send unencrypted data to a particular output port.

Thus, various embodiments contemplate that processor configurations, compiler configurations or both processor configurations and compiler configurations may be directed to ensuring/verifying that code executed on a processor will never result in an unencrypted payload being sent to an output port or, in the case of a microprocessor including both secure and non-secure output ports, sent to a secure output port.

When executing code on a processor with an AEAS instruction, it is at times very important to be able to prove that all payload data going to a particular port will be encrypted. As discussed above, this proof may be provided in a number of ways.

First, the processor may only have AEAS instructions where relevant.

Second, the processor may have non-encrypting output instructions that send data to a given port that also has an AEAS instruction. In this case the assembly code or the executable binary can be searched for the non-encrypting instructions and such instructions may be identified, eliminated and/or replaced. Differing levels of certainty of such proof are contemplated by the inventors. For example, differing levels of risk may be associated with executable code searches performed at the process level or other levels (if at all), including when combined with techniques to ensure process isolation.

Third, by removing non-encrypting instruction(s) from the software development environment. This allows the hardware to have both encrypting and non-encrypting instructions, yet individual projects may not have access to the non-encrypting output instructions. One only needs to prove the non-encrypting output instructions are not in the software development environment being used by the project.

In various embodiments, positive controls, (non-encrypting output instructions), are inserted into the code to enable the flagging of an invalid opcode during assembly and thereby provide assurance that the assembler being used could not create a non-encrypting instruction. The microprocessor design technique combined with software checks provides a mechanism to ensure data delivered to specific ports is always encrypted. Furthermore where security thresholds are lower, various embodiments allow for the clear identification of when data is encrypted and when it isn't encrypted prior to being sent to an output port.

The various embodiments contemplate that Explicit/Direct port addressing as well as Indexed/Indirect port addressing are allowable, as long as the specific/resolved destination address is known or knowable at compile time, such that if the destination port address is to a secure port then the instructions can be examined to ensure that the data is encrypted.

Addressing techniques that cannot be known or knowable at compile time may include memory-mapped addressing of ports wherein the destination address depends on an argument such as an input variable/address received during operation. In this case, the instruction cannot be guaranteed to avoid transmitting unencrypted data via a secure port and, therefore, the instruction is prohibited. Such an instruction may be described as supporting "compile-time unresolvable addressing."

Various embodiments contemplate techniques to prohibit the use of certain instructions may include a microprocessor designed to have a reduced instruction set that does not include any instruction supporting "compile-time unresolvable addressing," or to have only one output port, where that one output port comprises a secure output port through which only encrypted output is allowed, or to have at least one each of secure and non-secure output ports, wherein instruction supporting "compile-time unresolvable addressing" may be allowed if they explicitly prevent sending any output to the at least one secure output port.

Various embodiments contemplate a compiler that generates an error in response to encountering an instruction supporting "compile-time unresolvable addressing" such that compilation of the source code is stopped, or where assembly language instructions may be restricted to those from an approved library of assembly language macros, or that generates a warning in response to encountering an instruction supporting "compile-time unresolvable addressing" such that compilation of the source code is allowed, but with warnings identifying the offending instructions. This may be useful in early development cycles where implementing basic program functions is the goal, with a view to final development cycles in which offending generate errors and stop compilation. Assembly language instructions may be restricted to those from an approved library of assembly language macros.

In various embodiments, the microprocessor is capable of supporting multiple programs or processes such that secure/encrypted programs/processes may be executed contemporaneously with non-secure/non-encrypted programs/processes. In these embodiments, where a particular program/process is deemed to be a secure/encrypted program/process, the microprocessor constrains (as described herein) the operation of at least the secure/encrypted program/process executed by the microprocessor such that it will never result in an unencrypted payload being sent to an output port or, in the case of a microprocessor including both secure and non-secure output ports, sent to a secure output port. In some embodiments, if one secure/encrypted program/process is being executed by the microprocessor, then the microprocessor will treat all programs/processes is being executed by the microprocessor as secure/encrypted programs/processes.

Figure 5:
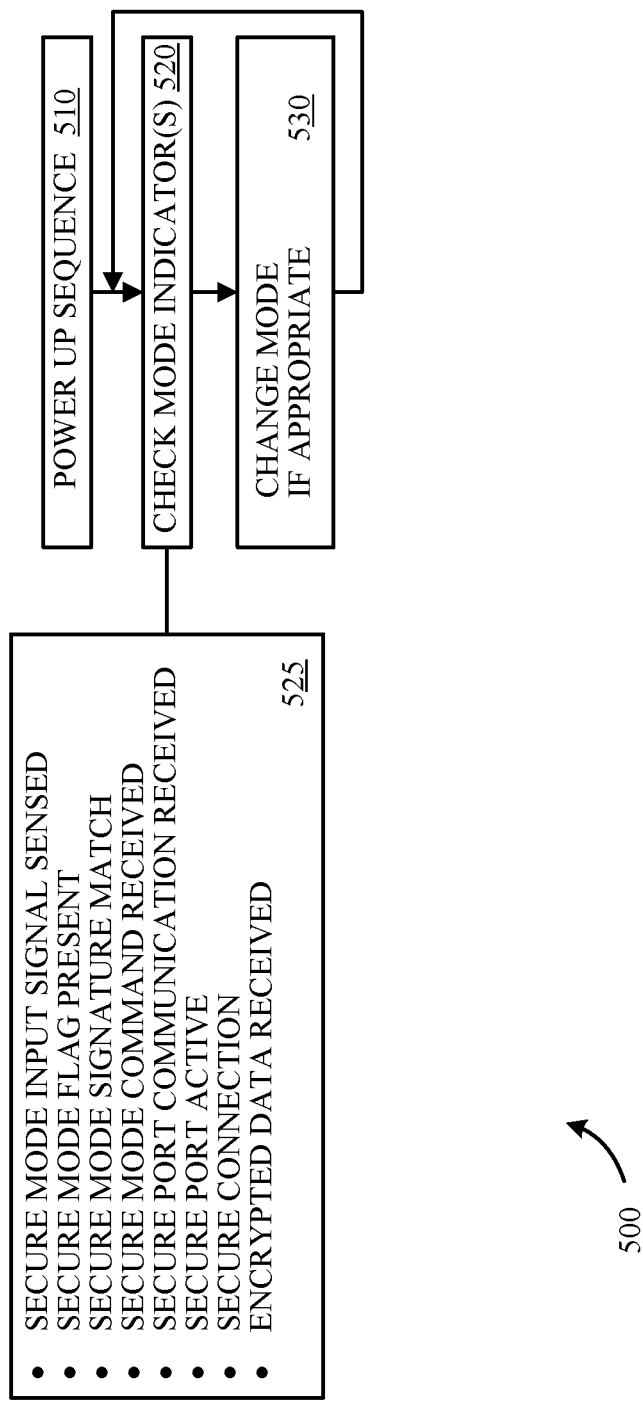

FIG. 5 depicts a flow diagram of a secure mode selection method according to an embodiment. In particular, the method 500 of FIG. 5 is suitable for use in selectively causing a microprocessor to operate in a secure/encrypted/black data mode as discussed above.

At step 510 the execution of a power on sequence of the microprocessor begins.

At step 520, a determination is made as to whether one or more secure mode indicators exist, wherein each of the secure mode indicators is intended to cause the microprocessor to enter a secure operating mode as discussed above. Referring to box 525, the secure operating mode is indicated where one or more of the following conditions are present. A secure mode input signal is sensed, such as a microprocessor pin being pulled up or down to a specific voltage level and the like. A secure mode flag present within the code being executed by the microprocessor. A secure mode signature match has occurred, such as between a signature in the code being executed by the microprocessor and a hardware or software identification associated with the microprocessor, its firmware and the like. A secure mode command is received, such as from a device in communication with the microprocessor. A secure port communication is received, such as data being received via a secure port. A secure port is active, such as due to connection to another device, receiving data, and/or other indications of port activity. A secure connection has been made, such as an indication of a connection of a "black data" cable to a black/secure output plug associated with the microprocessor or a device including the microprocessor, encrypted data is received either at a secure port or, optionally, any port. Other indications of a desire to operate in a secure mode may be provided.

In the embodiment of FIG. 5, it is contemplated that the microprocessor will stay in a secure operating mode until such time as power is cycled. In other embodiments, if the mode indicators checked at step 520 no longer indicate secure operating mode, then the microprocessor may revert to a non-secure operating mode.

A microprocessor may comprise a full instruction set microprocessor having a secure operating mode which, when invoked, inhibits microprocessor execution of any instruction within a normal instruction set of the microprocessor that (a) supports compile-time unresolvable port addressing or (b) supports data output to a secure port without encryption of the data. Other variations are contemplated.

The microprocessor may be configured to enter the secure operating mode in response to one or more of a predefined signal level being sensed at a microprocessor input terminal, a flag in a compiled program indicative of the program comprising a secure operating mode program, a signature within the compiled program identifying the microprocessor as a secure microprocessor, receiving a secure mode command via an input port, and a determination that the microprocessor is configured for communication with a secure device. Other variations are contemplated.

The signature within the compiled program may comprise hardware or software signatures associated with each of one or more microprocessors, each signature being configured to cause a respective microprocessor to operate in one of a secure operating mode and a non-secure operating mode. The hardware signature may comprise a microprocessor device identifier, and the software signature may comprise one of a firmware or software identifier. Other variations are contemplated.

The determination that the microprocessor is configured for communication with a secure device may comprise one or more determining that a secure port is active, determining that a physical connection has been made with a secure port, and determining that data received via an input port is encrypted. Other variations are contemplated.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of guaranteeing encryption of data provided at a secure output port of a microprocessor, comprising:
modifying an instruction set of said microprocessor that facilitates transmission of data on said secure output port with an Atomic Encrypt And Send (AEAS) instruction so as to ensure that
said microprocessor does not execute any instruction within a normal instruction set of said microprocessor that enables compile-time unresolvable port addressing; and
said microprocessor does not execute any instruction within a normal instruction set of said microprocessor that enables data output to said secure port without encryption of said data;
wherein said microprocessor comprises only one said secure output port, and said instruction set lacks an ability to execute any data output instruction without encryption of said data.

2. The method of claim 1, wherein said microprocessor comprises a microprocessor configured as a reduced instruction set microprocessor having said instruction set implemented as an instruction set architecture (ISA).

3. The method of claim 2, wherein said microprocessor comprises one secure output port and at least one non-secure output port, and said ISA lacks an ability to execute any data output instruction without encryption of the data where the data destination is a secure port.

4. The method of claim 1, wherein said microprocessor comprises a full instruction set microprocessor having an invokable secure operating mode.

5. The method of claim 4, wherein said microprocessor is configured to enter said secure operating mode in response to one or more of a predefined signal level being sensed at a microprocessor input terminal, a flag in a compiled program indicative of the program comprising a secure operating mode program, a signature within the compiled program identifying the microprocessor as a secure microprocessor, receiving a secure mode command via an input port, and a determination that said microprocessor is configured for communication with a secure device.

6. The method of claim 5, wherein said signature within said compiled program comprises hardware or software signatures associated with each of one or more microprocessors, each said signature being configured to cause a respective microprocessor to operate in one of a secure operating mode and a non-secure operating mode.

7. The method of claim 6, wherein said hardware signature comprises a microprocessor device identifier, and said software signature comprises one of a firmware or software identifier.

8. The method of claim 4, wherein a determination that said microprocessor is configured for communication with a secure device comprises one or more determinations that a secure port is active, determining that a physical connection has been made with a secure port, and determining that data received via an input port is encrypted.

9. A microprocessor configured to guarantee encryption of data provided at a secure output port, comprising:
an instruction set modified with an Atomic Encrypt And Send instruction to ensure that
said microprocessor does not execute any instruction within a normal instruction set of said microprocessor that enables compile-time unresolvable port addressing; and
said microprocessor does not execute any instruction within a normal instruction set of said microprocessor that enables data output to said secure port without encryption of said data; and
wherein said microprocessor comprises only one said secure output port, and said instruction set lacks an ability to execute any data output instruction without encryption of said data.

10. The microprocessor of claim 3, wherein said microprocessor is configured as a reduced instruction set microprocessor having said instruction set implemented as an instruction set architecture (ISA).

11. The microprocessor of claim 10, wherein all secure port input/output (I/O) instructions within said ISA require using destination specific output instructions that encrypt a payload portion of an output packet for at least those destinations comprising secure output ports.

12. The microprocessor of claim 11, wherein said ISA further comprises destination specific output instructions that do not encrypt a payload portion of an output packet.

13. The microprocessor of claim 10, wherein said ISA further comprises group I/O group instructions configured to send output data to any output port within a first group of output ports while being incapable of sending output data to an output port within a second group of output ports.

14. The microprocessor of claim 3, wherein said microprocessor comprises a full instruction set microprocessor having an invokable secure operating mode.

\* \* \* \* \*